United States Patent
Wills

(10) Patent No.: US 12,043,389 B2
(45) Date of Patent: Jul. 23, 2024

(54) AIRCRAFT PASSENGER ACCOMMODATION UNIT

(71) Applicant: Safran Seats GB Limited, Cwmbran (GB)

(72) Inventor: Paul John Wills, Cwmbran (GB)

(73) Assignee: Safran Seats GB Limited, Cwmbran (GB)

( * ) Notice: Subject to any disclaimer, the term of this patent is extended or adjusted under 35 U.S.C. 154(b) by 149 days.

(21) Appl. No.: 17/771,461

(22) PCT Filed: Oct. 29, 2020

(86) PCT No.: PCT/GB2020/052728
§ 371 (c)(1),
(2) Date: Apr. 23, 2022

(87) PCT Pub. No.: WO2021/084249
PCT Pub. Date: May 6, 2021

(65) Prior Publication Data
US 2022/0388666 A1 Dec. 8, 2022

Related U.S. Application Data

(60) Provisional application No. 62/927,411, filed on Oct. 29, 2019.

(51) Int. Cl.
*B64D 11/06* (2006.01)
*B64D 11/00* (2006.01)
(Continued)

(52) U.S. Cl.
CPC ...... *B64D 11/0606* (2014.12); *B64D 11/0023* (2013.01); *E05B 65/08* (2013.01);
(Continued)

(58) Field of Classification Search
CPC .................. B64D 11/0606; B64D 11/0023
See application file for complete search history.

(56) References Cited

U.S. PATENT DOCUMENTS

| 5,704,661 | A | 1/1998 | Takimoto | |
|---|---|---|---|---|
| 2007/0051048 | A1* | 3/2007 | Krohn | B64C 1/1469 49/413 |

(Continued)

FOREIGN PATENT DOCUMENTS

| CA | 3047149 A1 | 7/2018 |
|---|---|---|
| GB | 2548901 A | 10/2017 |

(Continued)

OTHER PUBLICATIONS

International Patent Application No. PCT/GB2020/052728, International Search Report and Written Opinion, dated Feb. 2, 2021.

*Primary Examiner* — Timothy D Collins
*Assistant Examiner* — Justin Michael Heston
(74) *Attorney, Agent, or Firm* — Kilpatrick Townsend & Stockton LLP

(57) ABSTRACT

The present invention provides an aircraft passenger accommodation unit comprising a seat, a shell that allows a passenger egress between an aisle and the seat through an opening, and a door assembly comprising a door slidable with respect to the shell between a retracted position and an extended position, a slide track attached to the shell, a slide runner for sliding along the slide track, and a connection mechanism for selectively connecting the door to the slide runner, wherein the door has a first sliding mode in which the connection mechanism connects the door to the slide runner and wherein the slide runner slides along the slide track, and a second sliding mode in which the connection mechanism does not connect the door to the slide runner and wherein the door slides in relation to the slide track. The (Continued)

invention also provides a door arrangement and associated methods.

15 Claims, 6 Drawing Sheets

(51) Int. Cl.
 *E05B 65/08* (2006.01)
 *E05C 19/02* (2006.01)
 *E05C 19/04* (2006.01)
 *E05D 15/06* (2006.01)
(52) U.S. Cl.
 CPC .............. *E05C 19/02* (2013.01); *E05C 19/04* (2013.01); *E05D 15/063* (2013.01); *E05Y 2201/214* (2013.01); *E05Y 2201/64* (2013.01); *E05Y 2800/252* (2013.01); *E05Y 2900/502* (2013.01)

(56) References Cited

U.S. PATENT DOCUMENTS

| | | | |
|---|---|---|---|
| 2018/0281963 A1 | 10/2018 | Dowty et al. | |
| 2019/0063113 A1 | 2/2019 | Milligan et al. | |
| 2019/0210733 A1 | 7/2019 | Herault et al. | |
| 2020/0122838 A1* | 4/2020 | Bonnefoy | B64D 11/0023 |
| 2021/0163139 A1* | 6/2021 | Bonnefoy | B64D 11/0606 |

FOREIGN PATENT DOCUMENTS

| | | |
|---|---|---|
| JP | 5084035 B2 | 11/2012 |
| KR | 200444723 Y1 | 6/2009 |
| WO | 2018033599 A1 | 2/2018 |
| WO | 2018093825 A1 | 5/2018 |
| WO | 2018184778 A1 | 10/2018 |
| WO | 2021084479 A1 | 5/2021 |

* cited by examiner

AIRCRAFT PASSENGER ACCOMMODATION UNIT

CROSS REFERENCE TO RELATED APPLICATION

This application claims the benefit of U.S. Provisional Application No. 62/927,411, filed on Oct. 29, 2019, and entitled EMERGENCY PASSAGE FEATURE FOR EXTERNALLY HUNG SUITE DOOR, the content of which is hereby incorporated by reference in its entirety.

BACKGROUND OF THE INVENTION

The present disclosure relates to an aircraft passenger accommodation unit for location in an aircraft cabin. The disclosure also provides a door arrangement for an aircraft passenger accommodation unit, and associated methods.

Business class and first class seating generally aims to provide aircraft passengers with as much privacy as possible. However, safety restrictions require that passengers are visible to cabin crew in some circumstances, and require that passengers can easily access the aisle in event of emergency.

Privacy doors and windows for aircraft passenger accommodation units are known. WO2018/033599A1, US2018/281963A1 and GB2548901A all disclose examples of doors of aircraft passenger accommodation units, which improve a seat occupant's privacy.

Often, privacy doors slide or pivot between open and closed configurations, thus enabling variable levels of passenger privacy and/or variable access between the passenger seat and the aisle. Pivotable doors may pivot outwardly into an aisle, causing an obstruction. It is desirable to maximise available space in the aircraft cabin and it is important to avoid obstructing the aisle, to allow other passengers and cabin crew to safely move about the plane.

Often, privacy doors generally use a pivoting or sliding mechanism to move between open and closed configurations. If this mechanism were to fail, passenger access to the aisle may be blocked, which is undesirable.

The present invention seeks to mitigate the above-mentioned problems. Alternatively, or additionally, the present invention seeks to provide an improved aircraft passenger accommodation unit.

SUMMARY OF THE INVENTION

The present invention provides an aircraft passenger accommodation unit for location adjacent to an aisle in an aircraft cabin, the unit comprising a seat, a shell, at least partially surrounding the seat, wherein the shell defines an opening that allows a passenger egress between the aisle and the seat through the opening, and a door assembly, for providing variable access through the opening between the aisle and the seat, wherein the door assembly comprises a door slidable with respect to the shell between a retracted position, in which the door is at least partially overlapping with the shell to provide access to the opening, and an extended position, in which the door is at least partially non-overlapping with the shell to at least partially close off access to the opening, a slide track attached to the shell, a slide runner for sliding along the slide track, and a connection mechanism for selectively connecting the door to the slide runner, wherein the door has two sliding modes a first sliding mode in which the connection mechanism connects the door to the slide runner and wherein the slide runner slides along the slide track, and a second sliding mode in which the connection mechanism does not connect the door to the slide runner and wherein the door slides in relation to the slide track.

This allows the door to be selectively connected and disconnected from the slide runner and so allow the door to slide even if the slide runner gets stuck in relation to the slide track. In other words, when the usual sliding mode (the first one) gets jammed, the door can still be moved by the second (emergency) slide mode.

In the first sliding mode, the connection mechanism connects the door to the slide runner and the slide runner (and the door) slides along the slide track. Hence, the door slides in relation to the shell.

In the second sliding mode, the connection mechanism does not connect the door to the slide runner and the door slides in relation to the slide track (and the slide runner). For example, the slide runner may stay fixed with respect to the slide track. Hence, the door slides in relation to the shell.

Preferably, the door assembly is provided with a release biasing member that urges the door away from the slide runner.

The release biasing member may be a spring. The release biasing member aids separation of the door and slide runner.

Preferably, the connection mechanism comprises a latch mechanism comprising a first latch member and a second latch member, the two latch members being selectively connectable to and releasable from each other, wherein the first latch member is provided on the door and the second latch member is provided on the slide runner.

More preferably, the latch mechanism comprises an actuator to release the first and second latch members from each other.

Preferably, the first and second latch members are releasable from each other upon a separation force having a magnitude exceeding a characteristic threshold being applied to the latch mechanism.

More preferably, the first and second latch members are releasable from each other upon a separation force of a certain magnitude being applied to the latch mechanism in a direction substantially parallel to the slide track.

This makes the emergency slide mode intuitive to use and/or activate. For example, there is no need for separate actuator. Helpfully, the first and second latch members may separate from each other in a direction substantially parallel to the slide track (i.e. in the slide direction).

Preferably, one of the latch members is provided with a detent and the other of the latch members comprises a protrusion biased to protrude into the detent.

The detent may be provided in the latch member in a direction transverse to the direction of the slide track. The detent may be provided in a direction substantially perpendicular to the direction of the slide track.

The protrusion may be a ball roller. The protrusion may be biased by a spring. The protrusion may be biased in a direction transverse to the direction of the slide track. The protrusion may be biased in a direction substantially perpendicular to the direction of the slide track.

The biasing of the protrusion may be overcome upon a separation force of a certain magnitude being applied to the latch mechanism in a direction substantially parallel to the slide track.

More preferably, the connection mechanism comprises at least two such latch mechanisms, and the door assembly comprises at least two such slide runners for sliding along the slide track, and wherein the second latch member of the first latch mechanism is provided on the first slide runner and the second latch member of the second latch mechanism is provided on the second slide runner.

The first and second latch mechanisms may be mounted at different heights in relation to the door assembly, transverse to the direction of the slide track. The first and second latch mechanisms may be designed to be released at the same time as each other, as the door and slide runners separate. The first and second latch mechanisms may be designed to be connected at the same time as each other, as the door and slide runners abut.

Preferably, the door is provided with at least one roller to allow the door to slide along the shell.

In the first mode, the door slides along the shell. Two rollers to allow the door to slide along the shell may be provided.

Preferably, the door is provided with at least one roller to allow the door to slide along a floor of the unit.

In the second mode, the door may slide along the floor. One or more (e.g. two) rollers to allow the door to slide along a floor of the unit may be provided.

Preferably, the door is provided with at least one roller to allow the door to slide along the slide track.

This roller may be located to abut an underside of the slide track. This may prevent rotation of the door with respect to the slide track (or shell), and/or may prevent upwards movement (and removal) of the door with respect to shell.

Preferably, the unit comprises at least one electrical cable attached at a first end to the door and attached at a second, opposite end to the shell, wherein the electrical cable is contained within a flexible cable carrier.

For example, the flexible cable carrier may be a CAT track.

The electrical cable may be used to provide power and/or control to a display on the door. For example, the door may have a display of the seat number, a "do not disturb" status, an "attendant call" status and/or a "power supply in use" status.

According to a second aspect of the invention there is also provided a door arrangement for an aircraft passenger accommodation unit, the door arrangement being for providing variable access through an opening of the aircraft passenger accommodation unit, wherein the door arrangement comprises a panel, a door slidable with respect to the panel between a retracted position, in which the door is at least partially overlapping with the panel, and an extended position, in which the door is at least partially non-overlapping with the panel, a slide track attached to the panel, a slide runner for sliding along the slide track, and a connection mechanism for selectively connecting the door to the slide runner, wherein the door has two sliding modes a first sliding mode in which the connection mechanism connects the door to the slide runner and wherein the slide runner slides along the slide track, and a second sliding mode in which the connection mechanism does not connect the door to the slide runner and wherein the door slides in relation to the slide track.

According to a third aspect of the invention there is also provided a method of using a door arrangement of an aircraft passenger accommodation unit, the method comprising the step of using the aircraft passenger accommodation unit or door as described above.

According to a fourth aspect of the invention there is also provided a method of using a door of an aircraft passenger accommodation unit, the method comprising the steps of sliding the door with respect to a shell of the aircraft passenger accommodation unit from: a retracted position, in which the door is at least partially overlapping with the shell to provide access to an opening of the shell to an extended position, in which the door is at least partially non-overlapping with the shell to at least partially close off access to the opening, and, when sliding the door, having the door connected to a slide runner such that the slide runner and door slide along a slide track attached to the shell, and sliding the door with respect to the shell from the extended position to a second retracted position, in which the door is at least partially overlapping with the shell to provide access to an opening of the aircraft passenger accommodation unit, and, when sliding the door, having the door disconnected from the slide runner and sliding the door in relation to the slide track and slide runner.

The second retracted position may or may not be the same as first retracted position.

Preferably, the method further comprises the steps of sliding the door with respect to the shell from the second retracted position to a second extended position, in which the door is at least partially non-overlapping with the shell to at least partially close off access to the opening, and re-connecting the door and the slide runner when the door is in the second extended position.

The second extended position may or may not be the same as first extended position. The second extended position may be fullest extent of the door travel. In other words, when the door is as closed as possible, the door and slide runner reconnect so as to attach the door to the slide runner (so that the door can slide with the slide runner on the slide track).

It will of course be appreciated that features described in relation to one aspect of the present invention may be incorporated into other aspects of the present invention. For example, the method of the invention may incorporate any of the features described with reference to the apparatus of the invention and vice versa.

DESCRIPTION OF THE DRAWINGS

Embodiments of the present invention will now be described by way of example only with reference to the accompanying schematic drawings of which.

DETAILED DESCRIPTION

Figure 1:
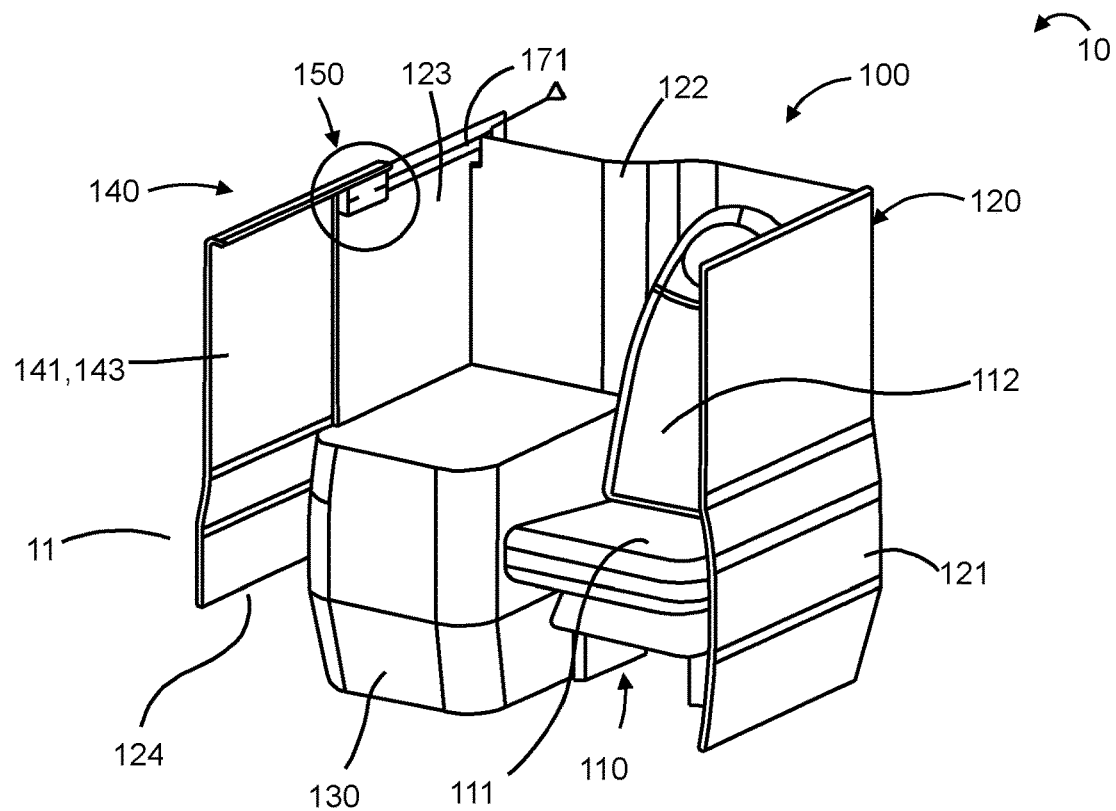
FIG. 1 shows perspective view of part of an aircraft cabin, including a passenger accommodation unit, according to a first embodiment of the invention, with a door in an extended/closed position.

FIG. 1 shows perspective view of part of an aircraft cabin 10, including a passenger accommodation unit 100, according to a first embodiment of the invention. The cabin 10 includes at least one aisle 11 and the accommodation unit 100 is located adjacent the aisle 11.

The accommodation unit has a seat 110. The seat 110 is a typical business-class aircraft seat with a seat pan 111 and a backrest 112. The seat 110 is convertible into a bed (not shown). Adjacent the seat 110 (on a right hand side as viewed by a passenger sat in the seat 110) is a console 130. The console 130 may provide a footwell for a seat behind (not shown) and/or storage or a table surface for the passenger in the seat 110.

The seat 110 and console 130 are at least partly enclosed by a shell 120. The shell 120 comprises a left side (viewed by a passenger in the seat 110) wall 121, a rear wall 122 (behind the backrest 112 of the seat 110 and the console 130) and a right side (viewed by a passenger in the seat 110) wall 123 adjacent an outer side of the console 130. This right side wall 123 is also adjacent the aisle 11. The right side wall 123 is provided with a door assembly 140 comprising a door panel 141.

Figure 2:
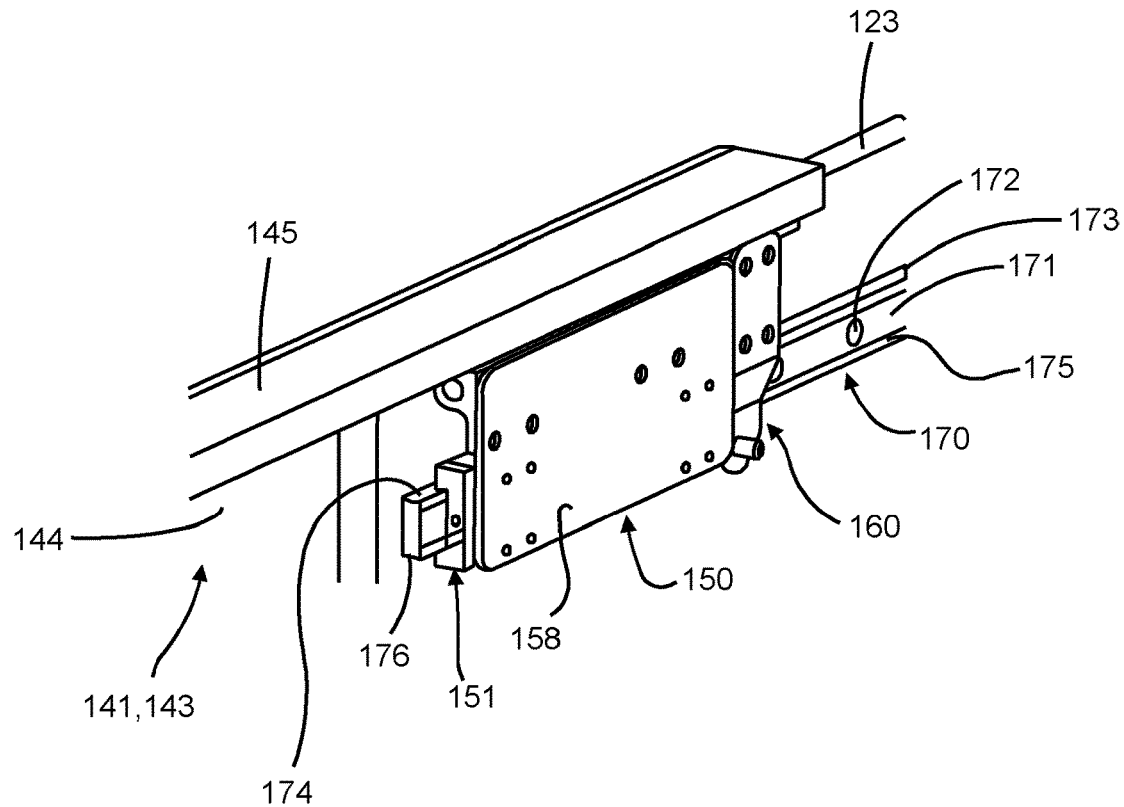
FIG. 2 shows an enlarged view of part of the passenger accommodation unit of FIG. 1, showing a mechanism for opening and closing the door.

The door panel 141 comprises a main panel portion 144 and a curved over top portion 145 (see FIG. 2). The door panel 141 can be slid in front of the right side wall 123 (i.e. in between the right side wall 123 and the aisle 11) to an open/retracted position 142. In this position, access to the seat 110 from the aisle 11 is allowed through an opening 124. FIG. 1 shows the door panel 141 in the closed/extended position 143. Here, the opening 124 is blocked by the door panel 141.

The door assembly 140 comprises a door runner assembly 150, a secondary door runner assembly 160, a shell mounted assembly 170 and a connection mechanism 180. These parts will be described in more detail below. As an overview, the door runner assembly 150 and secondary door runner assembly 160, in normal use, both run along the shell mounted assembly 170. The secondary door runner assembly 160 is attached to the door panel 141. The door runner assembly 150 is connected to the door panel 141 by the connection mechanism 180. When there is a jam or the door runner assembly 150 otherwise gets stuck on the shell mounted assembly 170, the connection mechanism 180 releases the door panel 141 from the door runner assembly 150 and allows it to run on the shell mounted assembly 170 using the secondary door runner assembly 160 only.

The shell mounted assembly 170 comprises a slide track 171 mounted using holes 172 to the inside (facing the seat 11) of the right side wall 123. The slide track comprises an upper rail 173 provided with a downwards facing notch 174 and a lower rail 175 with an upward facing notch 176 (see FIG. 2).

Figure 4:
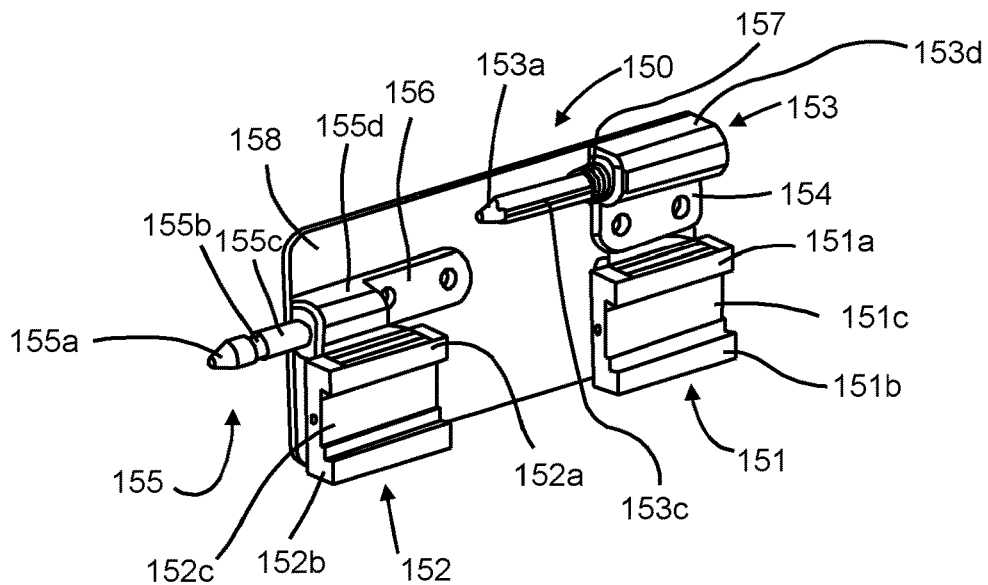
FIG. 4 shows a door runner assembly of the mechanism for opening and closing the door of FIG. 2.

The door runner mechanism 150 is also shown in FIG. 2, but largely covered by a rectangular cover panel 158. This assembly 150 is shown in FIG. 4 in a reverse view of the door runner assembly 150 with the different elements mounted to the back of the cover panel 158.

A first carriage 151 of the door runner mechanism 160 is mounted at one end, adjacent the lower edge of the cover panel 158 and comprises a C-shape slider with a top 151a, middle 151b and bottom 151c portion. The middle portion 151b is attached to the back of the cover panel 158. The top portion 151a extends outwards from the cover panel 158 and provides a downwardly facing protrusion (not labeled). The bottom portion 151c extends outwards from the cover panel 158 and provides an upwardly facing protrusion (not labeled). These protrusions fit into and slide along the downwards facing notch 174 and upwardly facing notch 176 of the slide track, respectively.

A similar second C-shaped carriage 152 is provided at the opposite end of the cover panel 158, also adjacent the lower edge of the cover panel 158 so that it can similarly slide along the same track 171 as the first carriage 151.

Hence, the door runner assembly 150 can slide back and forth along the slide track 171. It does this during normal operation of the door assembly 140. The door runner assembly 150 provides a high accuracy slide mechanism.

Above the first carriage 151, a first spigot 153 is mounted so as to be adjacent the top edge of the cover panel 158. The spigot 153 is mounted by a bracket 154 attached to the back of the cover panel 158. The shape of the bracket 154 ensures the spigot is spaced above from the first carriage 151. The spigot 153 comprises a spigot head 153a pointing towards the front end of the cover panel 158 (towards the second carriage 152) and an elongated portion 153b. At the base of the elongated portion (away from the head 153a) is a spring 157 abutting a widened base portion 153d of the spigot 153.

Directly above the second carriage 152 is a second spigot 155. Hence, this second spigot is mounted lower than the first spigot 153. Similarly to the first spigot, the second spigot 155 is mounted to the cover panel 158 by a bracket 156. However, here, the bracket 156 is shaped so that the spigot 155 can be mounted directly above (not spaced from) the second carriage 152. The second spigot 155 has a spigot head 155a pointing in the same direction as the first spigot head 153a. Behind the head 155a is a narrow "detent" neck portion 155b, an elongated portion 155c and a widened base portion 155d.

The spigots 153, 155 move with the first and second carriages 151, 152 along the slide track 171. They also provide a connection to the door panel 141 through the connection mechanism 180 (which will be described later) and so allow, during a normal mode, for the door panel 141 to be slid back and forth along the slide track 171 in relation to the right side wall 123, to open and close the door panel 141.

Referring to FIG. 2, the connection mechanism 180 will now be described. It comprises a first connection block 181 attached to the underside of the top 145 of the door panel 141. The connection block includes a hole 181a passing through it, at the appropriate height so that the first spigot 153 extends through the hole 181a.

A second connection block 182 is also attached to the underside of the top 145 of the door panel 141 and is similarly provided with a hole 182a passing through it. However, the hole 182a of this second block 182 is lower than the hole 181a of the first block 181 so as to be the appropriate height for the second spigot 155 to pass through it. It is also noted that the connection blocks 181, 182 are the same lateral distance apart as the two spigots 153, 155. Hence, both of the spigots 153, 155 are secured within the holes 181a, 182a of the connection blocks 181, 182 during normal operation of the door panel 141. The spigot 155 is held in connection block 182 by interaction between a ball sprung bias element (not shown) in the connection block 182 and the "detent" neck 155b portion of the spigot 155.

Hence, during normal operation, first and second carriages 151, 152 and hence the first and second spigots 153, 155 can be slid back and forth along the slide track 171 in relation to the right side wall 123. As they are connected through the connection blocks 181, 182 to the door panel 141, the door panel 141 is also able to slide back and forth to be open and closed.

Figure 3:
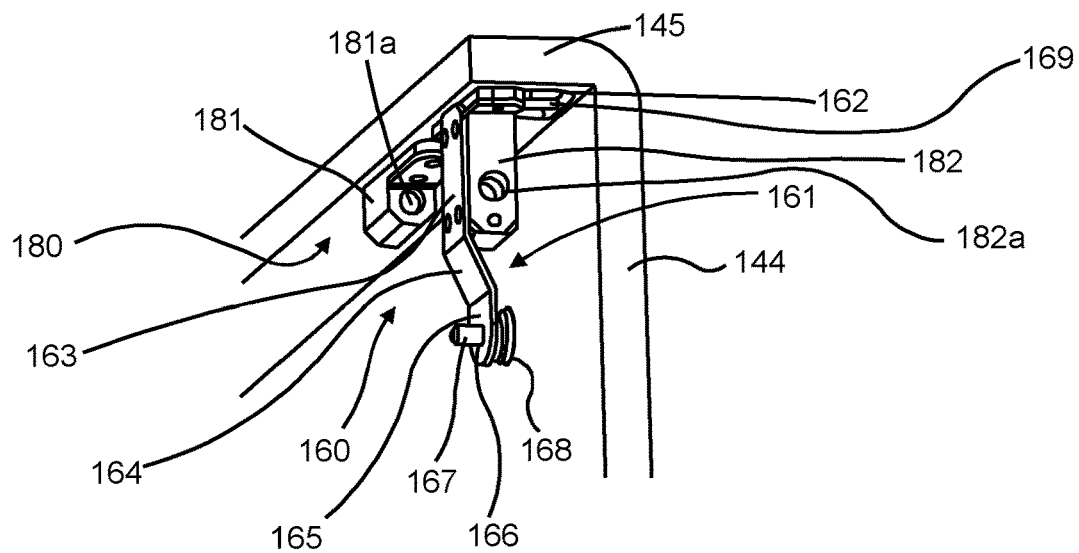
FIG. 3 shows a connection mechanism and secondary door runner of the mechanism for opening and closing the door of FIG. 2.
Figure 5:
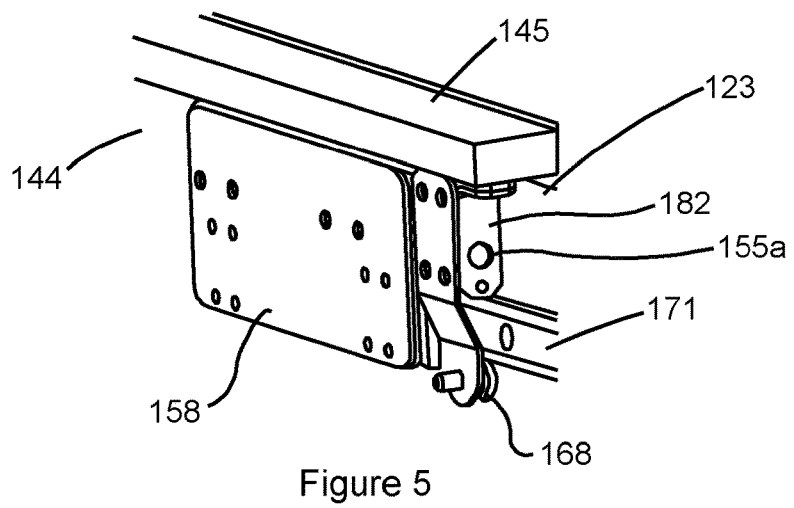
FIG. 5 shows a view from the other side of the mechanism for opening and closing the door of FIG. 2.
Figure 6:
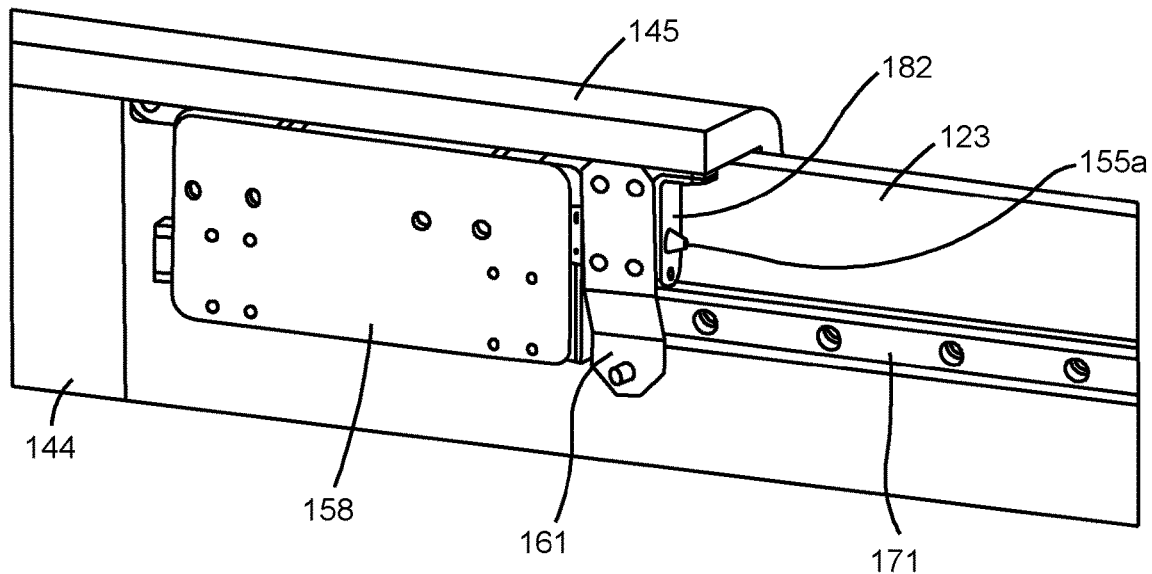
FIG. 6 shows a similar view to FIG. 5.
Figure 7:
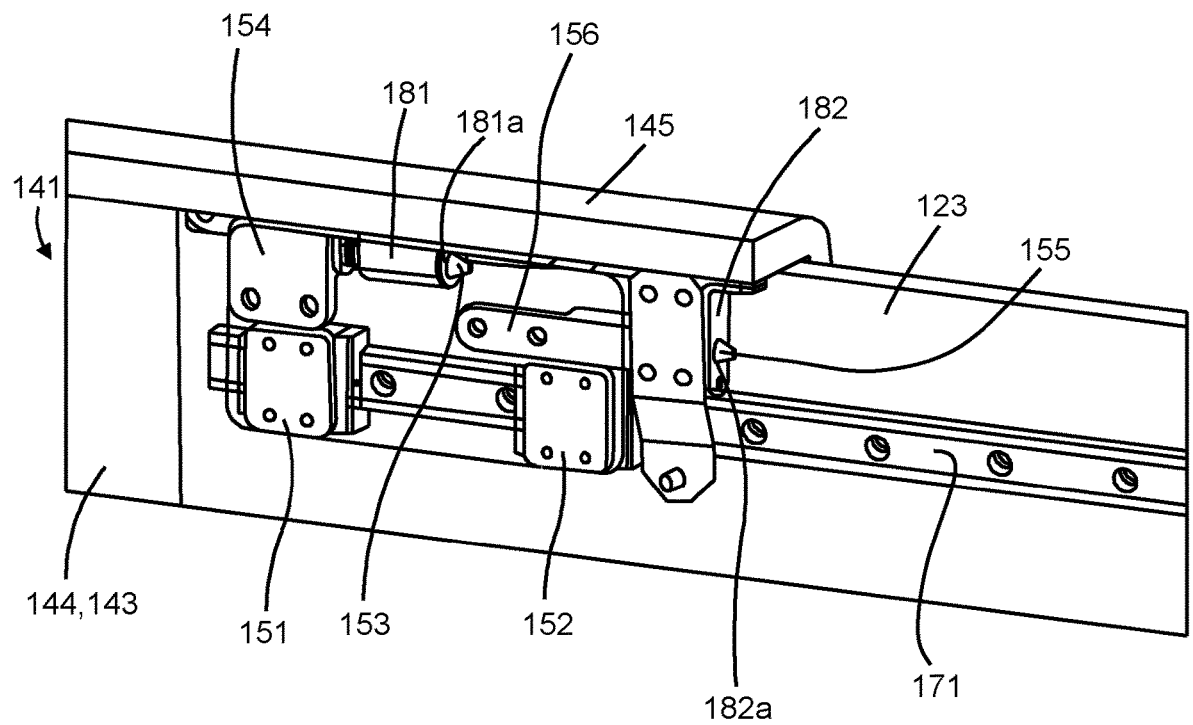
FIG. 7 shows a similar view to FIG. 6 with a cover panel removed.

However, in case one or both of the carriages 151, 152 got stuck, and so the door runner assembly 150 was unable to move along the slide track 171, when the door panel 141 is in the closed/extended position, a secondary way of opening the door panel 141 is provided for. Looking at FIGS. 2, 3 and 5, the secondary door runner assembly 160 will now be described.

This assembly 160 is in the form of a bracket 161 attached, by a flange portion 162, to a lower side of the curved over top portion 145 of the door panel 141. The bracket 161 extends downwards from there with a straight portion 163. This straight portion 163 abuts the second connection block 182 of the connection mechanism 180. An angled portion 164 of the bracket 161 angles under the second connection block 182 and then a second straight portion 165 extends downwardly. A hole 166 in the second straight portion 165 mounts an axle 167 of a slider wheel 168. The slider wheel 168 is mounted so that, during normal operation, the wheel edge is clear of the lower rail 175. However, in emergency operation, the wheel 168 abuts against and lies within the upward facing notch 176 of the lower rail 175. Hence, the slider wheel 168 is mounted to rotate as it is moved back and forth along the slide track 171 across the opening 124. It provides a low accuracy slide mechanism for emergency operation and prevents the door panel 141 from rotating or laterally moving away from the slide track 171.

When the door runner assembly 150 is unable to move along the slide track 171, the connection of the spigots 153, 155 and the connection blocks 181, 182 is broken by an override force of 15 lbs (emergency operation). Hence, when a user pushes on the door panel 141 to push it into the retracted/open position, this either causes the door runner assembly 150 to slide along the slide track 171 during normal operation after a normal operational force of 3 lbs, or, if it is jammed or stuck, for the connection blocks 181, 182 to be separated from the spigots 153, 155 once under a force of 15 lbs. It is noted that the spring 157 aids the separation of the connection blocks 181, 182 from the spigots 153, 155.

Figure 8:
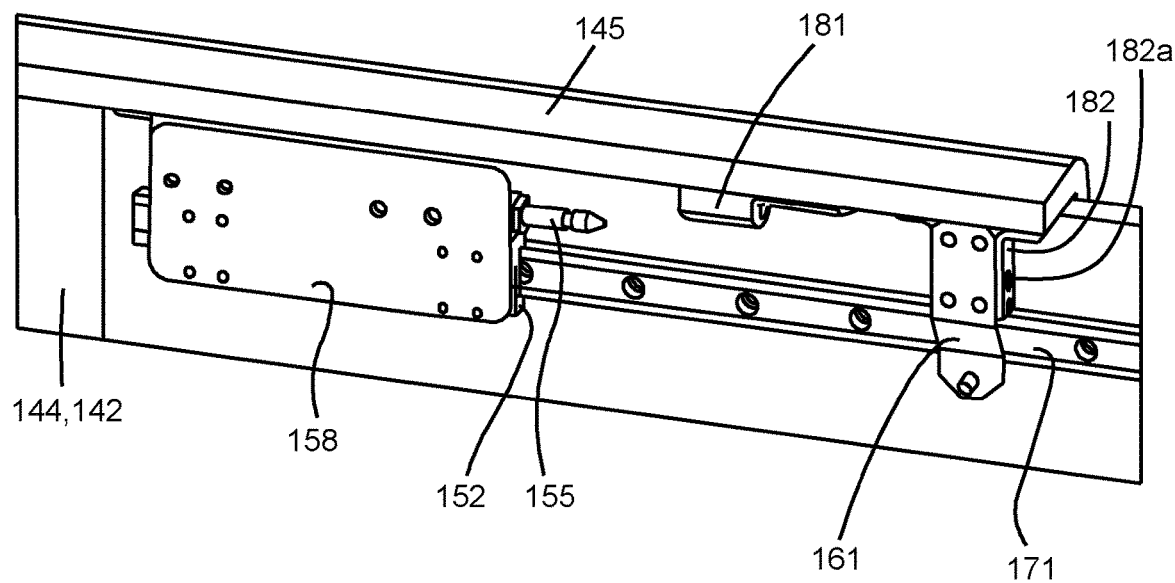
FIG. 8 shows a similar view to FIGS. 5 and 6, but with the door in an emergency retracted/open position.
Figure 9:
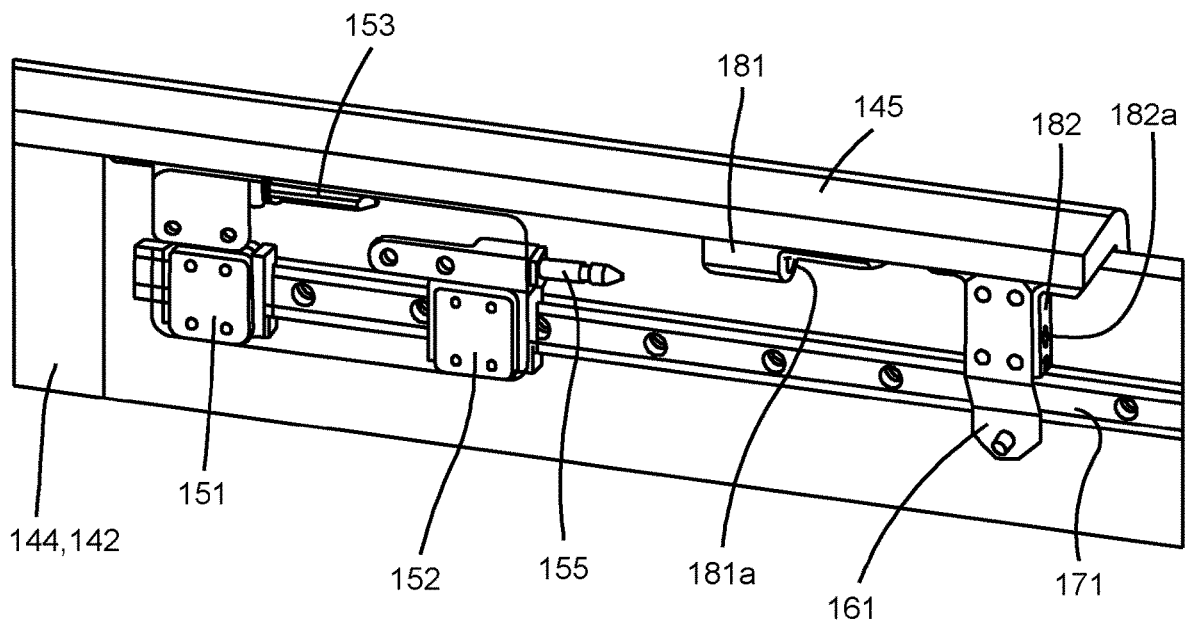
FIG. 9 shows a similar view to FIG. 8 with a cover panel removed.

Hence, when this happens, the door panel 141 (with attached connection blocks 181, 182) is slid along the slide track 171 by slider wheel 168. It also slides using two rollers (a rear one shown as 169 on FIG. 3, there is a similar front one) on the underside of the curved over top portion 145 of the door panel 141. These roll over the top of the right side wall 123 during emergency operation. (During normal operation, they remain approximately 1 mm clear of the top of the wall 123. This prevents or minimises them causing signs of wear on the wall 123.) Here, the door runner assembly 150 stays where it is (stuck) on the slide track 171. FIG. 8 shows a view of the door 141 in the retracted/open position 142, where this has been achieved by separating the connection blocks 181, 182 from the spigots 153, 155.

To "reset" the door assembly 140 back into normal operation once a jam has been removed, the door panel 141 is fully extended/closed. This forces the connection blocks 181, 182 back onto the spigots 153, 155 and pushes against the ball sprung bias element so that it can re-engage with the "detent" neck portion 155b to connect the door runner assembly 150 and door panel 141 once more.

Figure 10:
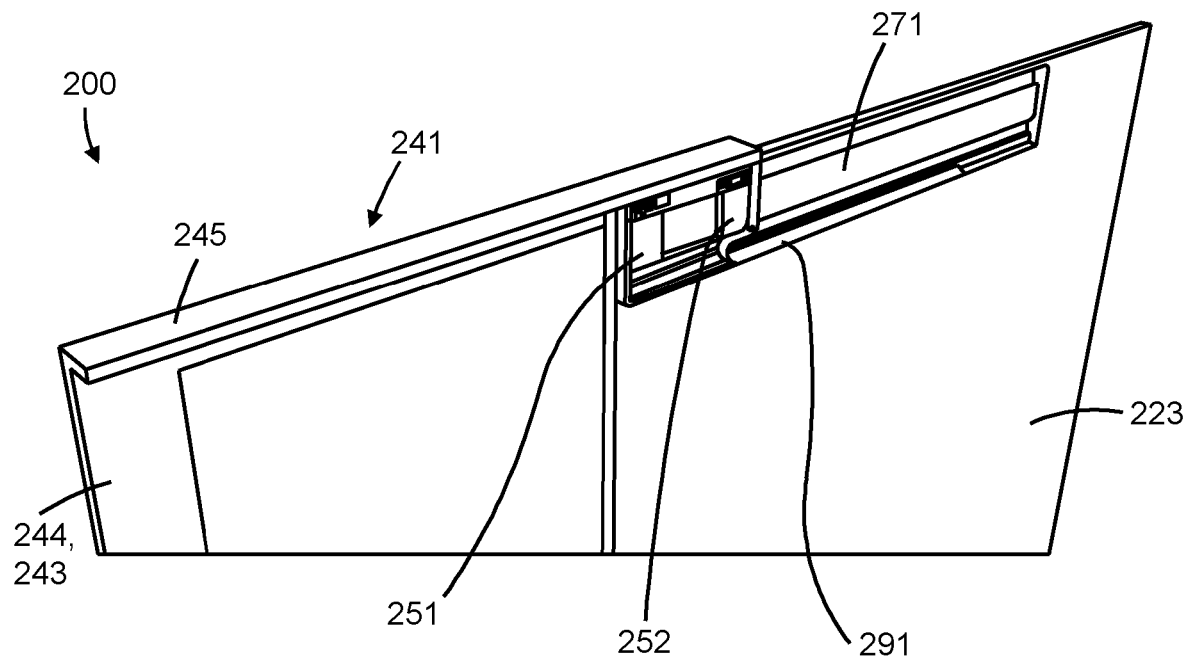
FIG. 10 shows perspective view of part of a passenger accommodation unit, according to a second embodiment of the invention, with a door in an extended/closed position.

FIG. 10 shows perspective view of part of a passenger accommodation unit 200, according to a second embodiment of the invention, with a door in an extended/closed position. This accommodation unit 200 is very similar to the one shown in FIGS. 1 to 9 and described above. Hence, only major differences will be discussed. The same reference numerals will be used, but preceded by a "2" instead of a "1".

Figure 14:
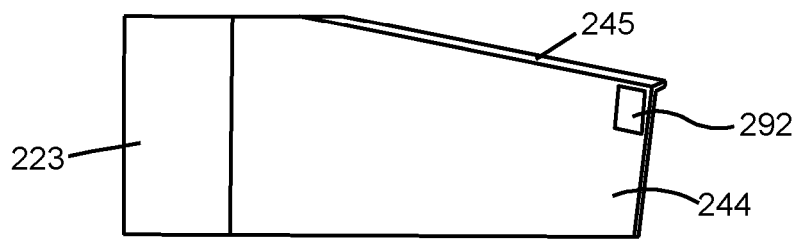
FIG. 14 shows a view of exterior side of part of the passenger accommodation unit of FIG. 10, with the door in the extended/closed position.

Here, the door assembly 240 is provided with a CAT flexible electrical track 291 connected between the right side wall 223 and the bracket 261. This provides a power and control link to the door panel 241 from the rest of the accommodation unit 200. This is used to power and control a display unit 292 located on an exterior side of the door panel 241 (shown in FIG. 14). This unit 292 is used to display the seat number, if the passenger has pressed the attendant button and/or if the passenger wished not to be disturbed.

Figure 11:
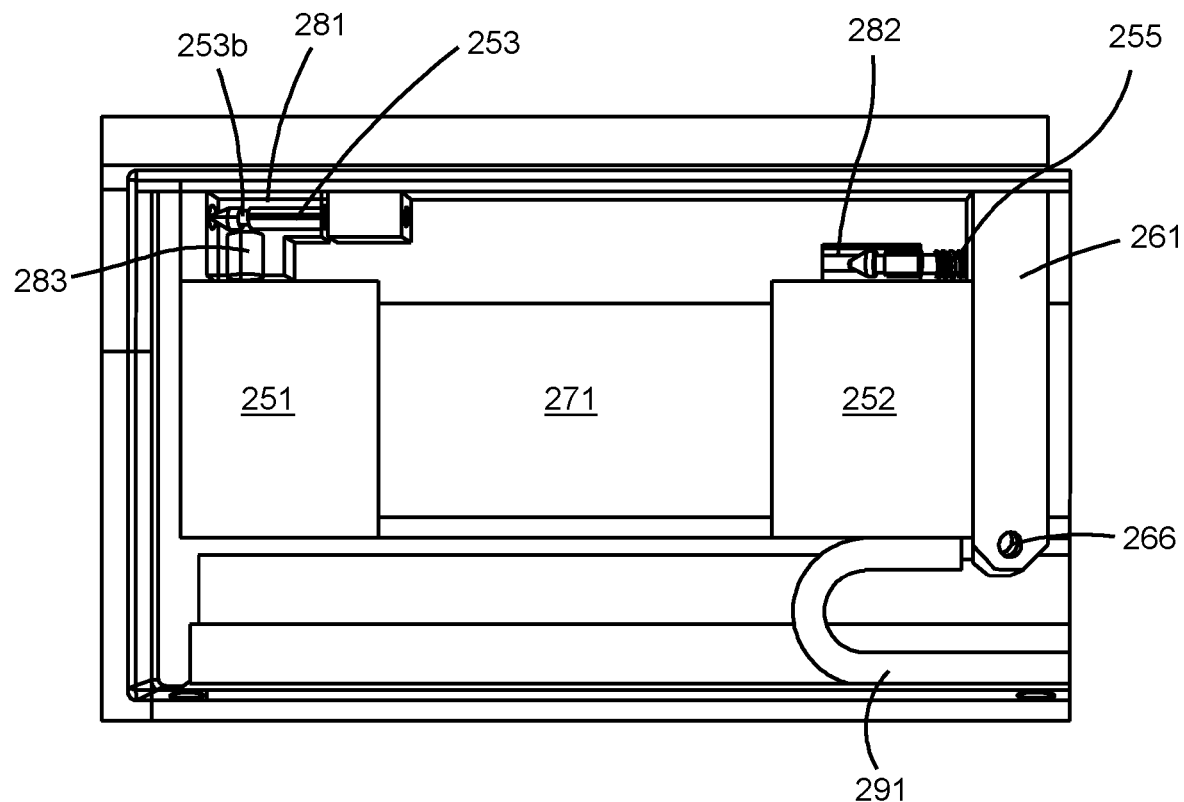
FIG. 11 shows an enlarged view of part of the passenger accommodation unit of FIG. 10, showing a mechanism for opening and closing the door.
Figure 12:
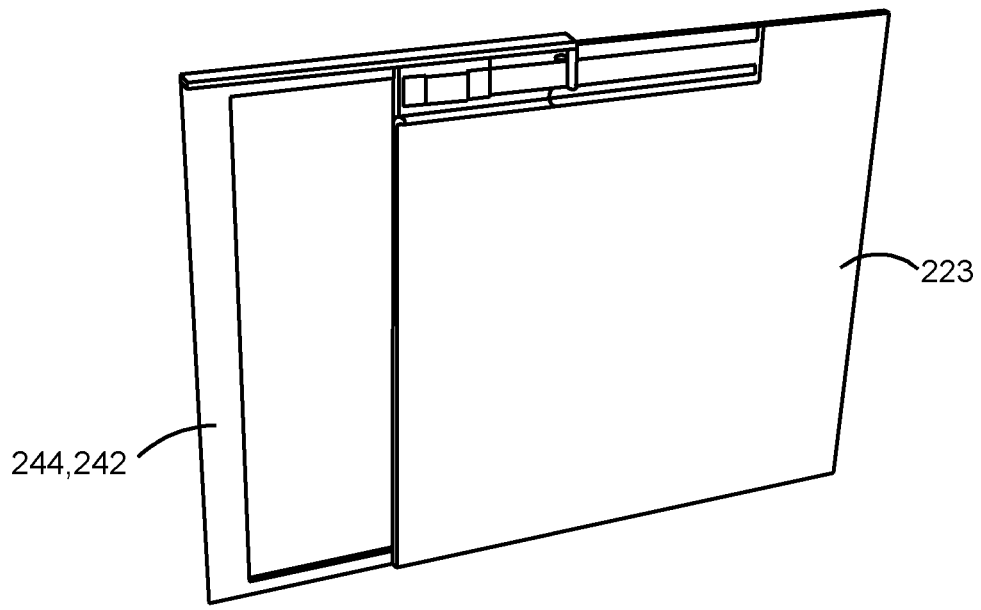
FIG. 12 shows a perspective view of part of the passenger accommodation unit of FIG. 10, with the door in a retracted/open position.
Figure 13:
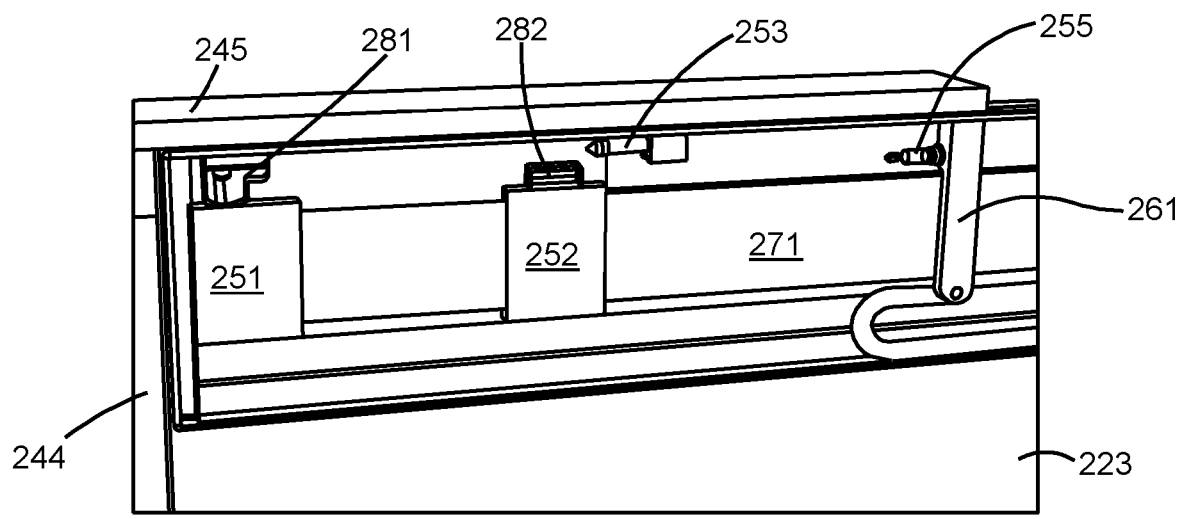
FIG. 13 shows an enlarged view of the mechanism for opening and closing the door, with the door in an emergency retracted/open position.

FIG. 11 shows an enlarged view of part of the passenger accommodation unit 200 of FIG. 10.

Here, the spigots 253, 255 are connected to the door panel 241 and the connection blocks 281, 282 are connected to the door runner assembly 250 (instead of the other way round). The first connection block 281 is located on top of the first carriage 251 and the first spigot 253 is connected to the door panel 241. The second connection block 282 is located on top of the second carriage 252 and the second spigot 255 is connected to door panel 241 via the bracket 261. Here, the bracket 261 extends straight down.

In addition, here, the first spigot 253 is provided with the "detent" neck portion 253b (instead of the second spigot). This "detent" is engaged by a door engagement latch 283 connected to the top of the first carriage 251, adjacent the first connection block 281.

The door engagement latch 283 is in the form of a cylinder with a domed top. This domed top engages with and corresponds in shape to the "detent" neck portion 253b to connect the door runner assembly 250 to the door panel 241. The latch 283 is biased upwards by a spring into the detent 253b. After experiencing a separation force of 15 lbs, this is enough to urge the latch 283 downwards (by the spigot head 253a) against the spring and release the spigot 253 from the connection block 281.

Whilst the present invention has been described and illustrated with reference to particular embodiments, it will be appreciated by those of ordinary skill in the art that the invention lends itself to many different variations not specifically illustrated herein. By way of example only, certain possible variations will now be described.

Any feature of one embodiment can be used with the other embodiment. For example, the first embodiment could be provided with a similar CAT track 291 and display unit 292.

The display unit 292 may also or alternatively be used: to show if PC power is in use, to show if a passenger is sat in the seat 110, 210, as an emergency light, as a taxi, take-off and landing (TTL) indicator, and/or as well as other lighting features.

The door panel 141, 241 may also or alternatively be released from the door runner assembly 150, 250 by a manually operated emergency release lever, or similar. This may be located at a forward edge (i.e. away from the seat 110, 210) of the door panel 141, 241.

Where in the foregoing description, integers or elements are mentioned which have known, obvious or foreseeable equivalents, then such equivalents are herein incorporated as if individually set forth. Reference should be made to the claims for determining the true scope of the present invention, which should be construed so as to encompass any such equivalents. It will also be appreciated by the reader that integers or features of the invention that are described as preferable, advantageous, convenient or the like are optional and do not limit the scope of the independent claims. Moreover, it is to be understood that such optional integers or features, whilst of possible benefit in some embodiments of the invention, may not be desirable, and may therefore be absent, in other embodiments.

It should be noted that throughout this specification, "or" should be interpreted as "and/or".

The invention claimed is:

1. An aircraft passenger accommodation unit for location adjacent to an aisle in an aircraft cabin, the unit comprising: —a seat, —a shell, at least partially surrounding the seat, wherein the shell defines an opening that allows a passenger egress between the aisle and the seat through the opening, and —a door assembly, for providing variable access through the opening between the aisle and the seat, wherein the door assembly comprises: —a door slidable with respect to the shell between a retracted position, in which the door is at least partially overlapping with the shell to provide access to the opening, and an extended position, in which the door is at least partially non-overlapping with the shell to at least partially close off access to the opening, —a slide track attached to the shell, —a slide runner for sliding along the slide track, and —a connection mechanism for selectively connecting the door to the slide runner, the connection mechanism comprising a latch mechanism comprising a first latch member and a second latch member, the two latch members being selectively connectable to and releasable from each other, wherein the first and the second latch members separate from each other in a direction parallel to the slide track, wherein the first latch member is provided on the door and the second latch member is provided on the slide runner, wherein the door has two sliding modes: i) a first sliding mode in which the connection mechanism connects the door to the slide runner and wherein the slide runner slides along the slide track, and ii) a second sliding mode in which the connection mechanism does not connect the door to the slide runner and wherein the door slides in relation to the slide track.

2. An aircraft passenger accommodation unit as claimed in claim 1, wherein the door assembly is provided with a release biasing member that urges the door away from the slide runner.

3. An aircraft passenger accommodation unit as claimed in claim 1, wherein the latch mechanism comprises an actuator to release the first and second latch members from each other.

4. An aircraft passenger accommodation unit as claimed in claim 1, wherein the first and second latch members are releasable from each other upon a separation force having a magnitude exceeding a characteristic threshold being applied to the latch mechanism.

5. An aircraft passenger accommodation unit as claimed in claim 4, wherein the first and second latch members are releasable from each other upon a separation force of a certain magnitude being applied to the latch mechanism in a direction substantially parallel to the slide track.

6. An aircraft passenger accommodation unit as claimed in claim 1, wherein one of the latch members is provided with a detent and the other of the latch members comprises a protrusion biased to protrude into the detent.

7. An aircraft passenger accommodation unit as claimed in 1, wherein the connection mechanism comprises at least two such latch mechanisms, and the door assembly comprises at least two such slide runners for sliding along the slide track, and wherein the second latch member of the first latch mechanism is provided on the first slide runner and the second latch member of the second latch mechanism is provided on the second slide runner.

8. An aircraft passenger accommodation unit as claimed in claim 1, wherein the door is provided with at least one roller to allow the door to slide along the shell.

9. An aircraft passenger accommodation unit as claimed in claim 1, wherein the door is provided with at least one roller to allow the door to slide along a floor of the unit.

10. An aircraft passenger accommodation unit as claimed in claim 1, wherein the door is provided with at least one roller to allow the door to slide along the slide track.

11. An aircraft passenger accommodation unit as claimed in claim 1, wherein the unit comprises at least one electrical cable attached at a first end to the door and attached at a second, opposite end to the shell, wherein the electrical cable is contained within a flexible cable carrier.

12. A door arrangement for an aircraft passenger accommodation unit, the door arrangement being for providing variable access through an opening of the aircraft passenger accommodation unit, wherein the door arrangement comprises: —a panel, —a door slidable with respect to the panel between a retracted position, in which the door is at least partially overlapping with the panel, and an extended position, in which the door is at least partially non-overlapping with the panel, —a slide track attached to the panel, —a slide runner for sliding along the slide track, and —a connection mechanism for selectively connecting the door to the slide runner, the connection mechanism comprising a latch mechanism comprising a first latch member and a second latch member, the two latch members being selectively connectable to and releasable from each other, wherein the first and the second latch members separate from each other in a direction parallel to the slide track, wherein the first latch member is provided on the door and the second latch member is provided on the slide runner, wherein the door has two sliding modes: i) a first sliding mode in which the connection mechanism connects the door to the slide runner and wherein the slide runner slides along the slide track, and ii) a second sliding mode in which the connection mechanism does not connect the door to the slide runner and wherein the door slides in relation to the slide track.

13. A method of using a door arrangement of an aircraft passenger accommodation unit, the method comprising the step of using the aircraft passenger accommodation unit or door arrangement of claim 1.

14. A method of using a door of an aircraft passenger accommodation unit, the method comprising the steps of: i) sliding the door with respect to a shell of the aircraft passenger accommodation unit from: a retracted position, in which the door is at least partially overlapping with the shell to provide access to an opening of the shell to: an extended position, in which the door is at least partially non-overlapping with the shell to at least partially close off access to the opening, and, when sliding the door, having the door connected to a slide runner such that the slide runner and door slide along a slide track attached to the shell, and ii) sliding the door with respect to the shell from: the extended position to a second retracted position, in which the door is at least partially overlapping with the shell to provide access to an opening of the aircraft passenger accommodation unit, and, when sliding the door, having the door disconnected from the slide runner and sliding the door in relation to the slide track and slide runner, wherein a connection mechanism selectively connects the door to the slide runner, the connection mechanism comprising a latch mechanism comprising a first latch member and a second latch member, the two latch members being selectively connectable to and releasable from each other, wherein the first latch member is provided on the door and the second latch member is provided on the slide runner, wherein the first and the second latch members separate from each other in a direction parallel to the slide track.

15. The method of claim 14, further comprising the steps of:
- iii) sliding the door with respect to the shell from: the second retracted position to: a second extended position, in which the door is at least partially non-overlapping with the shell to at least partially close off access to the opening, and
- iv) re-connecting the door and the slide runner when the door is in the second extended position.

\* \* \* \* \*